(12) United States Patent
Manley-Hood

(10) Patent No.: US 7,527,018 B2
(45) Date of Patent: May 5, 2009

(54) APPARATUS WITH AT LEAST ONE REPLACEABLE ELEMENT AND A BASE WITH ELEVATING MEANS FOR RAISING THE AT LEAST ONE RECEPTACLE ELEMENT

(76) Inventor: Gloria L. Manley-Hood, P.O. Box 120353, Arlington, TX (US) 76012

(*) Notice: Subject to any disclaimer, the term of this patent is extended or adjusted under 35 U.S.C. 154(b) by 371 days.

(21) Appl. No.: 11/433,029

(22) Filed: May 12, 2006

(65) Prior Publication Data

US 2007/0261641 A1 Nov. 15, 2007

(51) Int. Cl.
A01K 5/00 (2006.01)

(52) U.S. Cl. ............... 119/61.5; 220/23.87; 220/23.89; 220/737; 206/559

(58) Field of Classification Search ............... 119/454, 119/51.01, 61.5–61.57, 54, 55, 62; D30/121, D30/129, 133, 130; 269/236, 238–239; 206/804, 206/559; 220/23.87–23.89, 737
See application file for complete search history.

(56) References Cited

U.S. PATENT DOCUMENTS

| 730,082 | A | | 6/1903 | Bates | |
|---|---|---|---|---|---|
| 1,579,622 | A | * | 4/1926 | Rasmussen | 135/66 |
| 1,884,030 | A | * | 10/1932 | Maddox | 206/249 |
| 1,985,615 | A | * | 12/1934 | Mitchell | 206/527 |
| 2,555,396 | A | | 6/1951 | Cosner | |
| 3,698,594 | A | * | 10/1972 | Boehlert | 220/495.01 |
| 3,776,193 | A | | 12/1973 | Post, Sr. | |
| 3,991,719 | A | | 11/1976 | Bruce | |
| 4,182,462 | A | | 1/1980 | Buff, Jr. | |
| 4,860,691 | A | | 8/1989 | Mayer | |
| D330,785 | S | * | 11/1992 | Jordan | D30/129 |
| 5,445,110 | A | | 8/1995 | Birnie | |
| D367,736 | S | * | 3/1996 | Goetz | D30/130 |
| 5,794,843 | A | * | 8/1998 | Sanchez | 229/403 |
| 6,048,014 | A | * | 4/2000 | Stefanik | 294/99.1 |
| D424,252 | S | * | 5/2000 | Hirsh | D30/130 |
| 6,390,323 | B1 | | 5/2002 | Alticosalian | |
| 6,427,626 | B1 | | 8/2002 | Quinlan et al. | |
| 6,705,249 | B2 | | 3/2004 | Quinlan et al. | |
| 6,840,191 | B2 | | 1/2005 | Gaspary et al. | |
| D504,545 | S | | 4/2005 | Morosin | |
| 6,928,955 | B1 | | 8/2005 | Rokos et al. | |
| 7,204,202 | B2 | * | 4/2007 | Behun et al. | 119/61.5 |
| 7,392,761 | B2 | * | 7/2008 | Kujawa et al. | 119/61.5 |
| 2003/0033986 | A1 | | 2/2003 | Brown | |
| 2003/0192480 | A1 | * | 10/2003 | Bennett | 119/61 |

* cited by examiner

Primary Examiner—Andrea M Valenti (57) ABSTRACT

An apparatus has a base having a side that defines an interior space, and a periphery that defines an aperture above the interior space. A bowl element has a rim and is shaped to fit into the interior space such that the rim abuts the periphery. A lever mechanism has a lever, a fulcrum having an aperture, a pair of ears on opposite sides of the aperture, pins extending from each of the pair of ears into the lever for pivotally mounting the lever on the fulcrum, and an attachment element for attaching the fulcrum to the base. The lever has a proximal end adapted to abut the bowl element, and a distal end opposite the proximal end.

3 Claims, 9 Drawing Sheets

APPARATUS WITH AT LEAST ONE REPLACEABLE ELEMENT AND A BASE WITH ELEVATING MEANS FOR RAISING THE AT LEAST ONE RECEPTACLE ELEMENT

FIELD OF THE INVENTION

The present invention pertains to an apparatus with a base for receiving a removable and replaceable receptacle or bowl element or liner, and the means to elevate the removable and replaceable receptacle or bowl element or liner from the base.

BACKGROUND OF THE INVENTION

In certain aspects, this invention relates to a small animal feeder which comprises a receptacle holder and at least one removable and replaceable disposable receptacle. In certain other aspects, this invention relates to a holder for a sanitary bowl or liner which comprises a receptacle holder and at least one removable and replaceable receptacle.

Pet food bowls are generally made from inexpensive plastic materials, and it is usual practice to leave pet food in them for some time to permit the animal to eat at its leisure. It is observed, however, that moist pet food may desiccate and adhere to the surface of the bowl. Unless the remaining food is quickly removed from the surface of the bowl, the leftover food tends to adhere to the surface of the container. Dried pet food is relatively difficult to remove in the course of washing; furthermore, the oils and ingredients of pet food frequently coat or permeate the surface of most pet holder thus causing undesired odors and discoloration. One answer to this problem has been the use of disposable liners, receptacles, or bowls.

Three problems pertain to: (1) the ease in insertion and removable of a disposable liner or a bowl from a base which removal does not entail an operator having to touch the interior surface of the affected portion through use or contact; (2) providing for a liner or bowl sufficiently rigid to be used in a variety of applications, whether for human for animal food use, or commercial applications, such as in manicuring, with the liner or bowl being sufficiently flexible to permit deformation to fit snugly into a base and to permit easy removal from certain embodiments: and, (3) allowing for ease in storage and dispensing for use at least one liner for use in the base.

Currently available art does not satisfactorily address these common problems. The limited relevant prior art addresses these problems with a limited degree of success. A variety of disposable liners or bowls for pet feeding containers have been a solution and the subject of prior art. When disposable and replaceable liners and bowls are employed, one problem not addressed in the prior art is associated with the sanitary removal of the liner or bowl from the base. In certain prior art, the use of an air trap, adhesive strips and tabs have been presented as solutions. The prior art structures do not satisfactorily address the specific need to have a liner or bowl easily and sanitarily installed and removed by an operator, whereby the operator is not required to risk the unpleasant or unhealthful contact with the interior surface or the remaining contents of the interior of the liner. While the apparatus of the invention is directed primarily for use with pet food dispensing and serving, the apparatus of this invention is applicable where a sanitary bowl is desired. One application of this apparatus is for the dispensing for food to humans: one use entails adult snack food, while another entails a safe and sanitary dispenser for children, while yet another use addresses having a sanitary means for having food dispensed in a hospital environment. Another application relates to manicure service: warm soapy water or other suitable fluid can be contained in a disposable liner directly for a separate element which would rest within the liner. The apparatus of this invention is diversely applicable to a variety of uses requiring a removable sanitary container from a base. One advantage comprises an operator being able to sanitarily remove a replaceable and sanitary liner or bowl from a base with a non-skid type feeder.

Until this invention, there was no comparable cost-effective apparatus or system which provides for the easy, safe and sanitary insertion and removal of disposable liners or bowls employing a reusable base.

DESCRIPTION OF RELATED ART

Prior art apparatuses which provide for removable feeding bowl elements from a base address specific structures in the base or the removable element.

U.S. Pat. No. 730,082 (Bates) employs nested disposable paper plates adapted to be held in a rigid support or holder. As a means of engagement, the disposable place portion has position-securing marginal ears or tabs which fit into recesses in the edge of the rigid support.

U.S. Pat. Nos. 6,427,626 & 6,705,249 (Quinlan et al.) are a pet feeding system employing a detachable feeding vessel in combination with an elevated support structure, which support structure also serves as a feed storage container. The feeding vessel is secured in the support structure by a retaining means employing a retainer clip and a ball detent and by rotating the feeding vessel in the support structure to engage and disengage the retaining means. In certain embodiments a notch is employed at the rear of the lip of the feeding vessel to promote ease in grasping the feeding vessel.

U.S. Pat. No. 6,928,955 (Rokos, et al.) is an animal feeder with a cam system for opening a cover. In one embodiment, the opening system is activated by a lever action to provide the animal access to the interior compartment of the feeder.

U.S. Pat. No. 6,840,191 (Gaspary, et al.) is a base, namely a pet food dish which includes a removable liner. Elements of the liner serve as a clamp to hold the liner in position in the base.

U.S. Pat. No. 6,390,323 (Alticosalian) is a container employing a base and a removable liner. One or more flexible liners is held in place through an aperture in the base, and by a variety of means at or near the periphery of the base.

U.S. Pat. No. 5,445,110 (Birnie) is a pet feeding system employing disposable inserts positioned in a base. A plurality of disposable inserts include an adhesive element diametrically opposed to a notched region to permit the removable of a single insert from the base.

U.S. Pat. No. 4,860,691 (Mayer) is an animal feeder with a removable water pail.

U.S. Pat. No. 4,182,462 (Buff, Jr.) describes a sanitary pet feeding container comprising a plurality of layers of thin sheet material stacked, or nested, together. The sheet material is paper or plastic. Removable of each container is effected by an operator using finger pulls or tabs upstanding interiorly from the circumferential edges.

U.S. Pat. No. 3,991,719 (Bruce) is an animal feeding receptacle comprising a holder for supporting, holding and storing a quantity of nested bowl-shaped liners. A removable sleeve with an aperture exposes the interior surface of the uppermost available liner and a flange permitting removing of the sleeve from the holder.

U.S. Pat. No. 3, 776,193 (Post, Sr.) is an animal feeder comprising a holder and at least one receptacle The receptacle is removable and includes a handle, to permit removable of the receptacle. A non-skid mat is attached to the bottom of the holder to prevent sliding along the floor.

U.S. Pat. No. 2,555,396 (Cosner) is a feed receptacle for dogs and cats. A horizontally extending place with at least one opening accommodates at least one removable receptacle in the opening,.

U.S. Design Pat. D-504,545 (Morosin) is a pet food dispenser of a particular design.

U.S. Patent Application Publication U.S. 2003/0033986 (Brown) describes a base and a dish member with an annular grove. In certain embodiments an annular ring and removable lid are employed.

The relevant art relates to a pet feeder employing a base and at lease one removable and replaceable liner or bowl. Removing the replaceable liner or bowl is apparently effected by an operator removing the liner by its lip or edge, and occasionally requires the removable of an annual element around the periphery of the liner. Additionally, that prior art which describes a position securing means for the base of the apparatus relies of the weight or mass of food or water stored in the base, or a pad or mat or adhesive attached to the base. There is no teaching or suggestion pertaining to securing the removal of the liner by the way of the externally activated lever or switch position on the base to engage the exterior surface of the liner to facilitate removable by the operator. Nor does the prior art teach or suggest a structure for securing the position of the base by employing an element extending from the base along the supporting surface.

SUMMARY OF THE INVENTION

This invention is an apparatus consisting of a base with an elevating means to permit the facile removal of removable and replaceable bowls or liners. Directed primarily as an improved pet food bowl to facilitate the sanitary dispensing and removal of pet food bowls from a base, this invention addresses a structure for removing a removable bowl element or liner from a base without an operator necessarily touching the interior surface of the bowl element or liner. The removal of the bowl element or liner from the base is effected by use of an elevating means, which raises the bowl element or liner above the top of the base to permit easy removal.

DESCRIPTION OF CERTAIN PREFERRED EMBODIMENTS

As shown in the figures, one embodiment of the apparatus (10) comprises a base (11), for receiving a bowl element (20), and an elevating means (30) mounted on the base.

Figure 1:
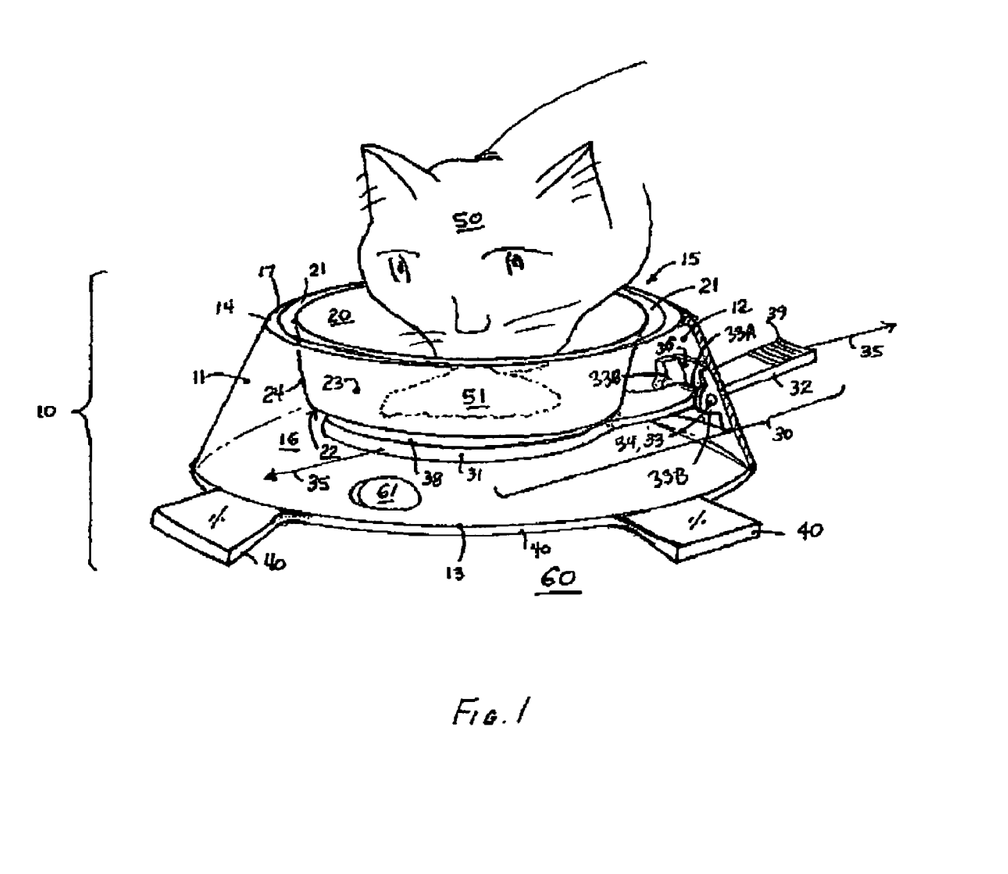
FIG. 1 is a front perspective view of one preferred embodiment of the invention.

The base (11) has at least one side (12), a bottom (13), a top (14), an aperture (15), and an interior space (16). As illustrated in FIG. 1, at least one side (12) of the base (11) is shown as tapering from the top (14) outwardly to the bottom (13), as is customary in pet-feeding bowls. In other embodiments, not shown in the figures, the at least one side (12) would not taper outwardly but would taper downwardly or inwardly. In certain embodiments, as illustrated in FIG. 1, the at least one side (12) has at least one cavity (61) to permit an operator to lift the base (11) from a supporting surface (60).

The shape of the base (11) is not limited to the radial or conic section commonly employed in pet feeding bowls. The drawings accompanying this application illustrate the elements of the apparatus (10) of the invention, thus the physical shape of the base (11) as illustrated is not intended to limit the invention disclosed.

In certain embodiments, as illustrated in the figures, the top (14) of the base (11) includes an aperture (15). Aperture (15) is illustrated as a generally annular opening permitting access to the interior space (16) of the base (11). At the top (13) is a lip (17), which defines the boundary of aperture (15) and which is the periphery upon which a rim (21) of a bowl element (20) rests.

The bottom (13) of the base (11) is the region in contact with a supporting surface (60). In a certain embodiment illustrated in FIGS. 2-4, the bottom (13) is generally circular and planar. The bottom (13) of the base (11) permits the level placement of the apparatus (10) upon the supporting surface (60). In one embodiment, illustrated best in FIGS. 2 & 3, the base (11) has dimensions with an outside diameter of 6.375 inches and a vertical height of 2.325 inches.

Figure 3:
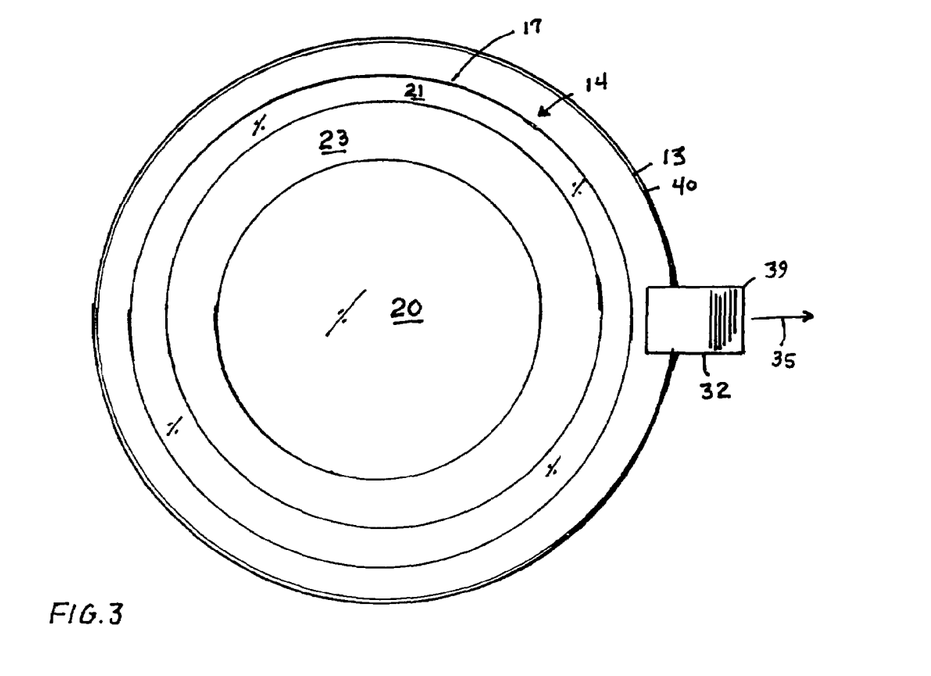
FIG. 3 is top view of the base and bowl element.

In certain embodiments, as illustrated in FIG. 1, the base (13) further includes at least one securing pad (40). Position securing pad (40) impedes the lateral motion of the base (11) along the supporting surface (60). In certain embodiments, as illustrated in FIG. 3, the position securing pad (40) is a gasket which forms a seal upon the supporting surface (60). The use of the at least one position-securing pad (40) adds stability for the base. In certain embodiments, the use of the at least one position-securing pad (40) adds weight to the base (11) for stability as well. The function of pad (40) is to prevent the base (11) from moving upon the supporting surface (60).

Figure 5:
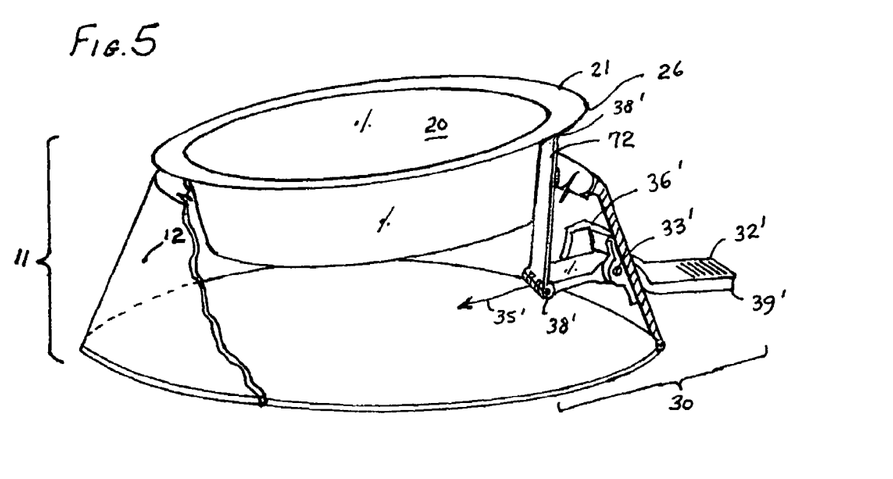
FIG. 5 is a cutaway perspective view of one embodiment of the invention where the elevating means is a lever mechanism with a rim-engaging element.

While in certain embodiments, position-securing pad (40) may be made of a rubber or synthetic compound or cloth, or adhesive, or any structure which is attached to, or made an integral part of, base (11) at or near the bottom (13) in order to impede lateral movement of the base (11). In another embodiment, as illustrated in FIG. 5, the at least one position-securing pad (40) is joined to the bottom (13) of the base (11) for the entire periphery of the base (11).

Figure 2:
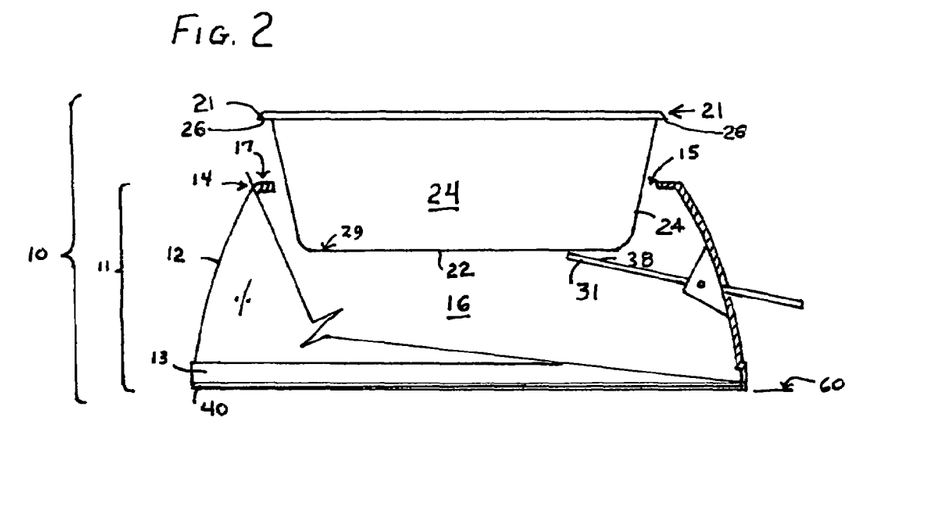
FIG. 2 is a side view of the base and bowl element.

The apparatus (10) includes a removable and replaceable bowl element (20). The bowl element (20) has a rim (21), an underside (22), an interior surface (23), and at least one side wall (24). Referring to FIGS. 1, 2 and 3, the bowl element (20) fits into the aperture (15) of the base (11). The bowl element (20) has an exterior shape (62) such that the underside (22) and the at least one side wall (24) fit into the interior space (16) of the base (11). When in place, as illustrated in FIG. 1, the bowl element (20) rests in the base (11) such that the interior surface (23) of the bowl element (20) accommodates contents (51). In certain embodiments, the at least one side wall (24) of the bowl element (20) is tapered to accommodate the head of a small animal. As illustrated in FIG. 1, contents (51) is for consumed by a small animal (50).

In certain embodiments, bowl element (20) is made of water-impermeable plastic. As illustrated in FIGS. 2 and 3, and in one embodiment, bowl element (20) has dimensions comprising a 4.625-inch outer diameter at the rim, a 3.875-inch outer diameter across the bottom (29), and a height of 1.625 inches. In other embodiments, bowl element (20) is made of paper, cellulose, foam beads, glass, ceramic, or metal. In yet other embodiments, bowl element (20) is made of foil-lined paper. In yet other embodiments, the bowl element (20) includes at least one side wall (24) and a rim (21) which are each deformable.

The rim (21) supports the bowl element (20) and bowl element (20) is thereby suspended by the top (14) of the base (11). The exterior dimensions of the rim (21) exceed the dimension of the aperture (15), thus permitting the rim (21) to support the bowl element (20) on the lip (17). As illustrated in the figures, rim (21) has a lower face (26) which engages the lip (17) at the top (14) of the base (11).

At least one side wall (24) snugly engages the inner edge (18) of the lip (17) so that the bowl element (20) is firmly emplaced in the base (11). In certain embodiments, the dimensions of the exterior (28) are the same as, or slightly less than, the dimensions of the aperture (15). By fitting snugly in the base (11), bowl element (20) is less likely to rotate or move out of the base (11).

The exterior shape of the bowl element (20) corresponds to the shape of the lip (17). In certain preferred embodiments, and as shown in the Figures, aperture (15) is a generally annular opening with a radius identical to the radius of the rim (21) of the bowl element (20). In other embodiments where the aperture (15) is not annular, the exterior dimensions and shape of the bowl element (20) corresponds to the dimensions and shape of the lip (17).

Figure 15A:
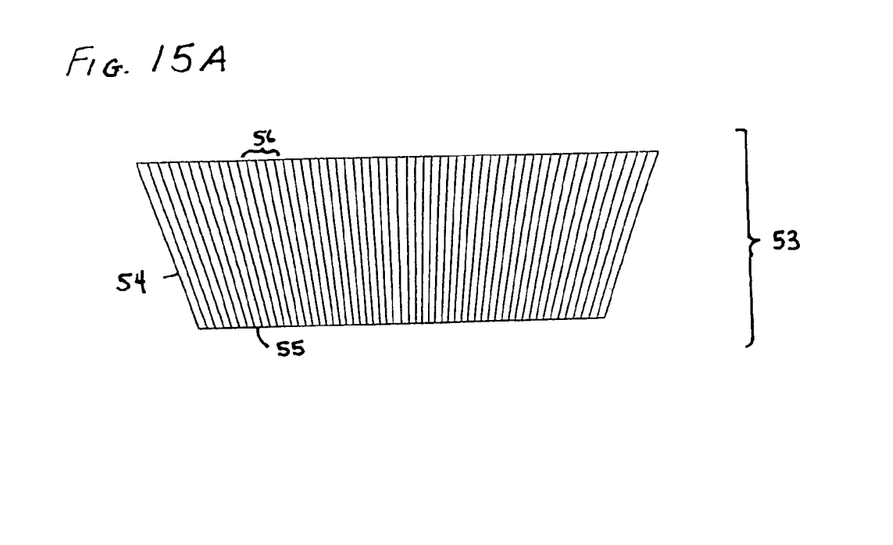
FIG. 15A is a side view of the liner.
Figure 15B:
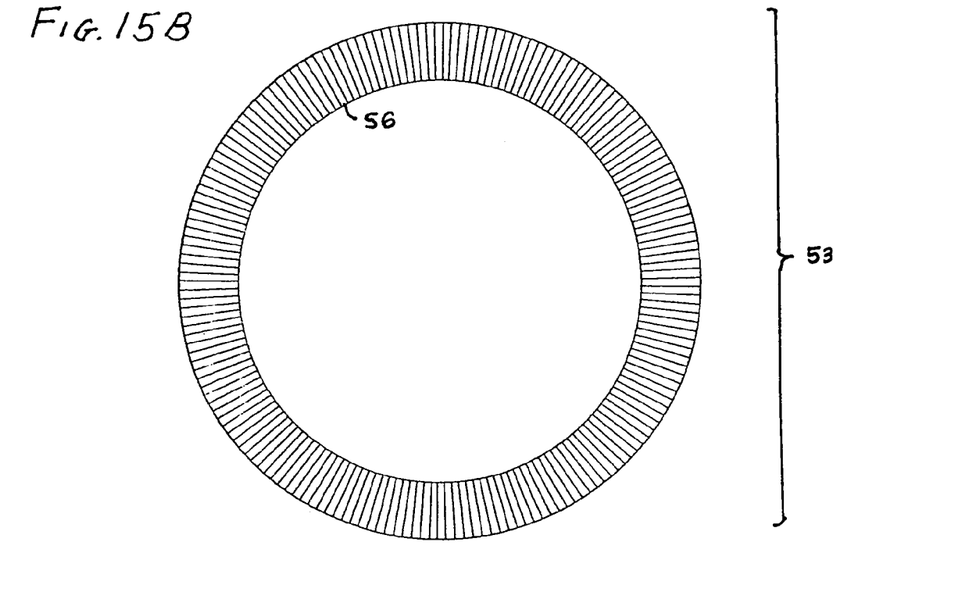
FIG. 15B is a top view of the liner.

Illustrated in FIG. 15 of the drawings, liner element (53) serves as a protective element for the interior surface (23) of bowl element (20). In these embodiments, the liner element (53) has an edge adapted to fit atop the interior surface (23) of the bowl element (20). In yet other embodiments, the liner element (53) is fluted and the edge extends above the rim (21) of the bowl element (20). As illustrated in FIGS. 15 A and 15 B, liner element (53) is foil-lined and pleated or fluted, for easy adaptation to the interior surface (23) dimensions and shape of bowl element (20). The foil lining (54) prevents seepage of moisture or oil from the contents (51) to the interior surface (23) of the bowl element (20). The contact surface (55) of the liner element (53) may be the same foil as the foil lining (54) or be made of paper or cellulose or other suitable material, including plastic, ceramic, etc. In other preferred embodiments, the liner element (53) may be made entirely of paper. In certain embodiments, the flutes (56) are shown extending above the rim (21) of the bowl element (20). In practice an operator may install and remove the liner element (53) from interior surface (23) of the bowl element (20) by grasping a portion of the flute (56) extending above the rim (21). As shown in FIGS. 15 A and 15 B, one embodiment of the liner element (53) has dimensions of 1.5 inches in height with a 4.5-inch outer diameter for placement on a 3.5-inch bowl (20).

Figure 4:
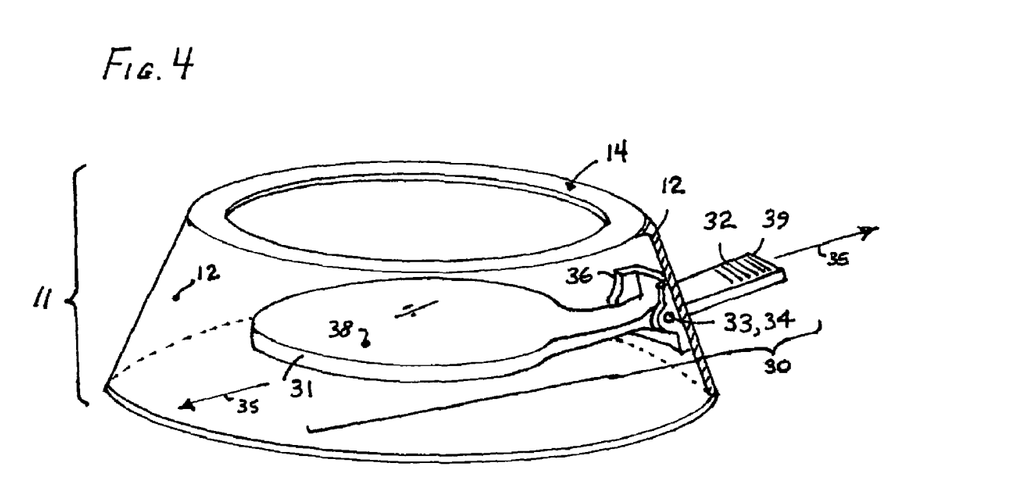
FIG. 4 is a cutaway perspective view of one embodiment of the invention where the elevating means is a lever mechanism with an underside-engaging element.

In certain embodiments, as illustrated in FIG. 4, the elevating means (30) is a lever mechanism (36) with an underside-engaging element (31), a fulcrum (33), a lever means (32), and an attachment means (36) being a structure attaching the fulcrum (33) to the at least one side (12) of the base (11). The underside-engaging element (31) has a longitudinal axis (35), a proximal end (38), for engaging the underside (22) of the bowl element (20), and a distal end (39). The fulcrum (33) is transverse to the longitudinal axis (35) of the underside-engaging element (31). As illustrated in FIG. 4, the lever means (32) is a handle. The lever means (32) is located at the distal end (39) of the underside-engaging element (31). The attachment means (36) accommodates the fulcrum (33) to the at least one side (12) of the base (11).

In certain embodiments, and as illustrated in FIG. 1, the fulcrum (33) employs a pin (34) which extends transversely to the longitudinal axis (35) of the lever means (32). In one embodiment, the fulcrum (33) is 1.25 inches from the bottom (13) of the base (11). In another embodiment, but not illustrated in the drawings, the fulcrum (33) does not employ a pin (34) but at least one fulcrum snap (37).

In operation, the underside-engaging element (31) is configured to engage the underside (22) of the bowl element (20). In operation, the underside-engaging element (31), contacts the underside (22) of the bowl element (20), and as the bowl element (20) is lifted, the rim (21) rises above the top (14) of the base (11).

Figure 4A:
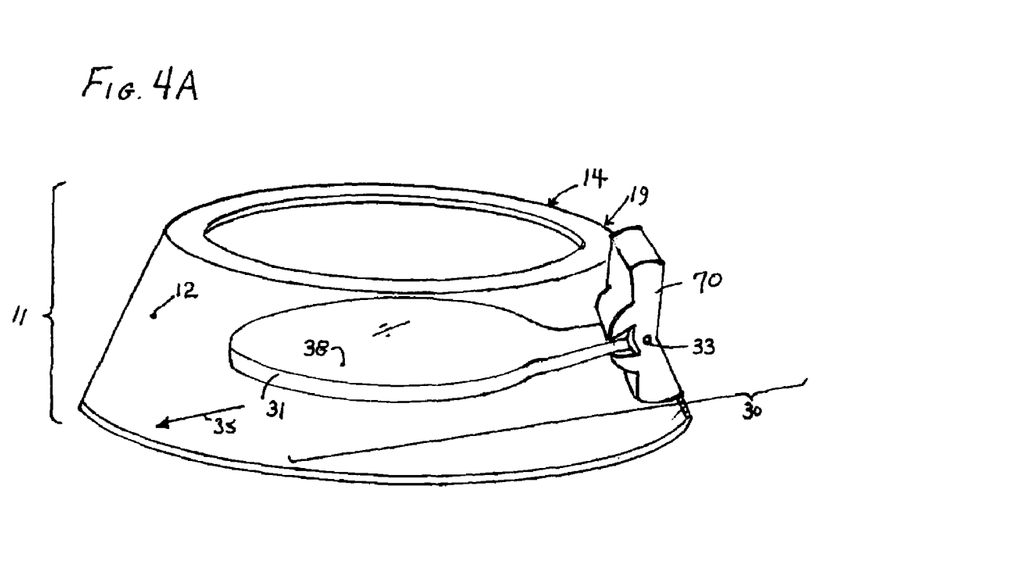

In yet further embodiments, as shown in FIG. 4A, the lever means (32) is actuated by a cantivelered switch (70) mounted to the exterior (19) of the at least one side (12) of the base (11). The wide style of switch (70) illustrates an embodiment permitting ease of operation by an operator, with an unlikely intervention of operation by the small animal (50) being fed.

In certain other embodiments, as illustrated in FIG. 5, the elevating means (30) is a lever mechanism (36') with a rim-engaging element (72), a fulcrum (33'), a lever means (32') and an attachment means (36') being a structure attaching the fulcrum (33') to the at least one side (12) of the base (11). The rim-engaging element (72) has a longitudinal axis (35'), a proximal end (38'), for engaging the lower face (26) of the rim (21) of the bowl element (20), and a distal end (39'). The fulcrum (33') is transverse to the longitudinal axis (35') of the rim-engaging element (72). The lever means (32') is located at the distal end (39') of the rim-engaging element (72). The attachment means (36') accommodates the fulcrum (33') to the at least one side (12) of the base (11). In operation, the lever mechanism (36') is configured to engage the lower face (26) of the rim (21) of the bowl element (20). In operation, the rim-engaging element (72), contacts the lower face (26) of the rim (21) of the bowl element (20), and as the bowl element (20) is lifted, the rim (21) rises above the top (14) of the base (11).

In one embodiment, the lever mechanism (36) comprises the lever (32), the fulcrum (33), and an attachment element (36) for attaching the fulcrum (33) to the at least one side (12) of the base (11). In this embodiment, the fulcrum (33) has an aperture (33A) for receiving the lever (32) therethrough. The fulcrum (33) further having a pair of ears (33B) on opposite sides of the aperture (33A). At least one pin (34) extends through each of the pair of ears (33B) into the lever (32) for pivotally mounting the lever (32) on the fulcrum (33). As discussed above, the proximal end (38) is adapted to abut the bowl element (20) when the bowl element (20) is in the interior space (16) of the base (11), and a distal end (39) is opposite the proximal end (38). Depressing the distal end (39) of the lever (32) raises the proximal end (38) and ejects the bowl element (20) from the interior space (16) of the base (11).

Figure 6:
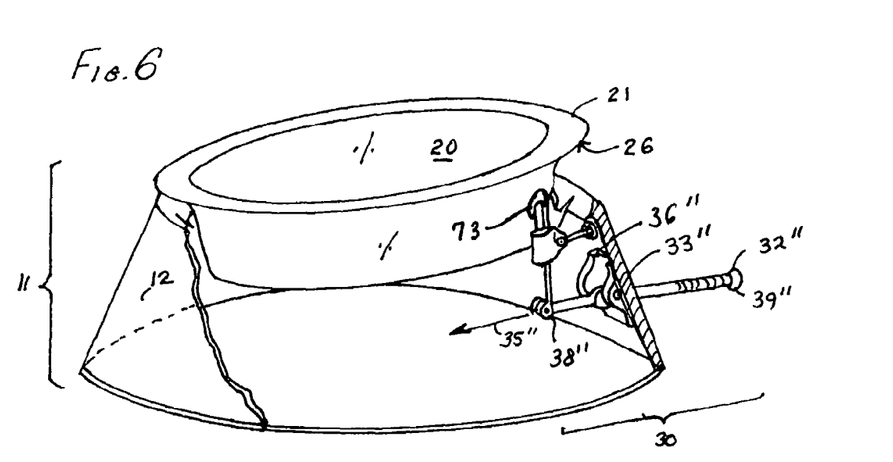
FIG. 6 is a cutaway side view of one embodiment of the invention where the elevating means is a lever mechanism with a side-engaging element.

In operation, the lever mechanism (36") is configured to engage the at least one side wall (24) of the bowl element (20). In operation, the side-engaging element (73), contacts the exterior (28) of at least one side wall (24) of the bowl element (20), and as the bowl element (20) is lifted, the rim (21) rises above the top (14) of the base (11).

In another embodiment, but not shown in the drawings, the lever mechanism (36") engages the exterior (28) of the at least one side wall (24) of the bowl element (20). When the side-engaging element (73) contacts the exterior (28) of the at least one side wall (24) of the bowl element (20), the application of force upon the lever means (32") results in the side-engaging element (73) deforming the at least one side wall (24) of the bowl element (20). As the at least one side wall (24) is deformed, the rim (21) which is attached to the at least one side wall (24) also undergoes a deformation. The rim (21) of the bowl element (20) is prevented from movement into the interior (16) of the base (11); the engagement of the lip (17) with the rim (21) and the inner edge (18) of the lip (17) with at least one side wall (24) results in the rim (21) being deformed and raised above the base (11) sufficiently to permit an operator to grasp the rim (21) of the bowl element (20) without the necessity of touching the interior surface (23) of the bowl element (20).

Figure 7:
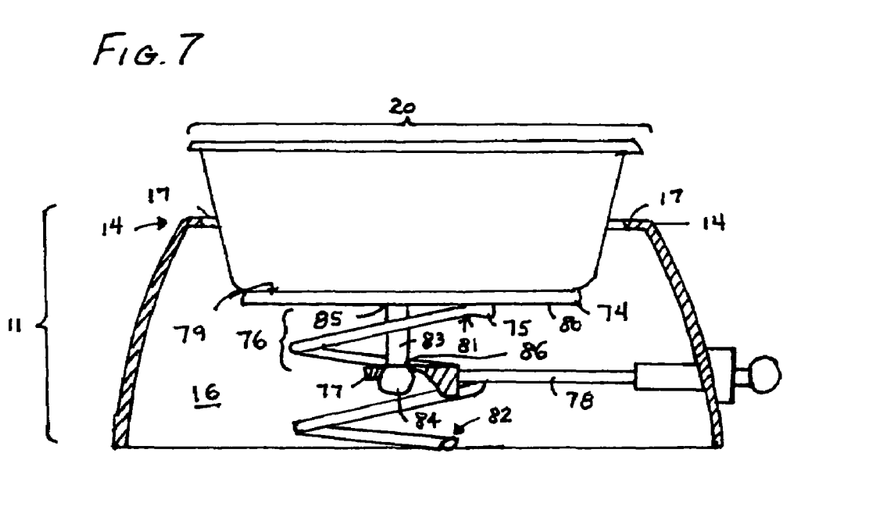
FIG. 7 is a cutaway side view of one embodiment of the invention where the elevating means is a spring mechanism with an underside-engaging element.
Figure 10:
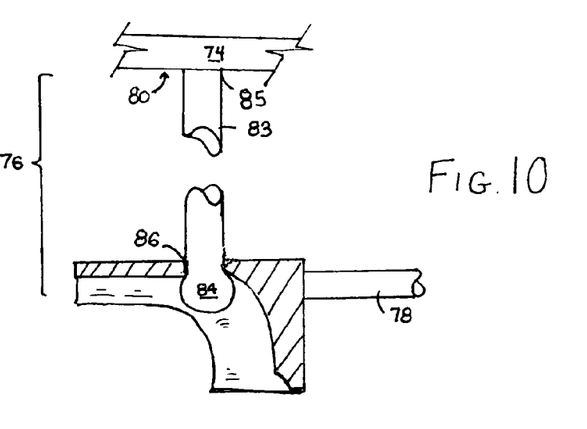
FIG. 10 is a cutaway side view illustrating the plunger and knob and collar in a lower position.
Figure 11:
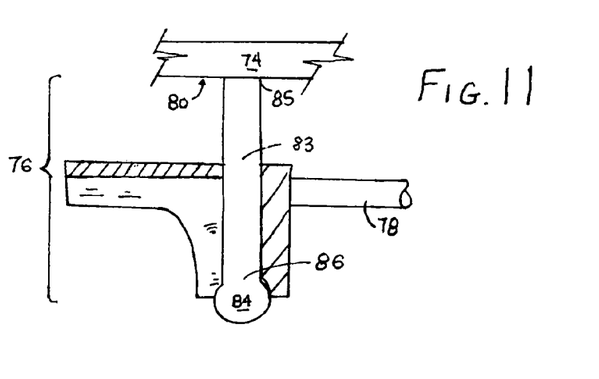
FIG. 11 is a cutaway side view illustrating the plunger and knob and collar in a higher position.

In certain other embodiments, as illustrated in FIG. 7, the elevating means comprises an elevating plate (74), a spring (75), at least one plunger (76), at least one releasable locking means (77), and an activator (78). The elevating plate (74) has a bowl-engaging upper surface (79) for engaging the underside (22) of the bowl element (20). The elevating plate (74) has a lower surface (80). The spring (75) has an upper end (81), attached to the lower surface (80) of the elevating plate (74). The spring (75) also has a lower end (82) at a fixed position within the interior space (16) of the base (11). The position of the lower end (82) of the spring (75), is either coplanar to, or above, the bottom (13) of the base (11). The elevating plate (74) also has at least one plunger (76) with a shaft (83) and a knob (84). The shaft (83) has a first end (85) and a second end (86). The first end (85) of the shaft (83) is attached to the lower surface (80) of the elevating plate (74). The knob (84) is located at the second end (86) of the shaft (83). The knob (84) engages the at least one releasable locking means (77) when the movable collar (87) receives the knob (84) of the at least one plunger (76). An activator (78) moves the movable collar (87) from a first position to a second position. As illustrated in FIG. 11, the first position holds the knob (84) in a lower stationary position, while the second position, illustrated in FIG. 10, permits the knob (84), and thus the at least one plunger (76) rises to a position above the first position. The force of the spring (75) pushes the elevating plate (74) upwards, thus raising the position of the bowl element (20) above the lip (17) at the top (14) of the base (11) so that an operator may remove the bowl element (20) without the necessity of touching the interior surface (23).

Figure 8:
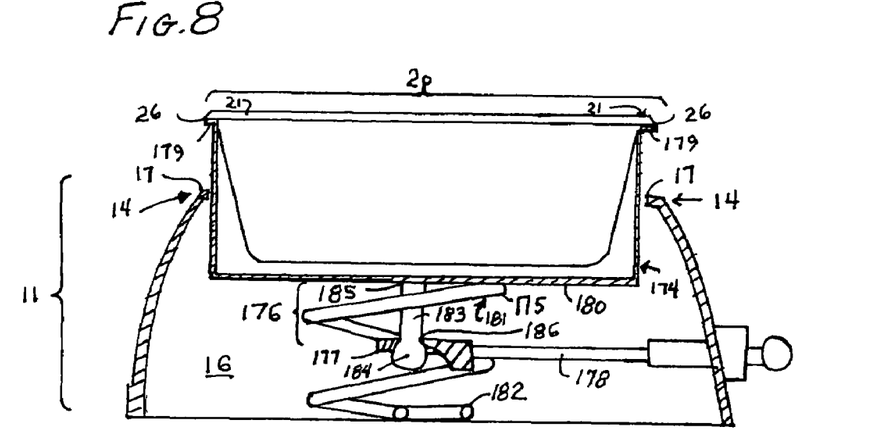
FIG. 8 is a cutaway side view of one embodiment of the invention where the elevating means is a spring mechanism with a rim-engaging element.

In certain other embodiments, as illustrated in FIG. 8, the elevating means comprises an elevating plate (174), a spring (175), at least one plunger (176), at least one releasable locking means (177), and an activator (178). The elevating plate (174) has at least one rim-engaging upper surface (179) for engaging the lower face (26) of the rim (21). The elevating plate (174) has a lower surface (180). The spring (175) has an upper end (181), attached to the lower surface (180) of the elevating plate (174). The spring (175) also has a lower end (182) at a fixed position within the interior space (16) of the base (11). The position of the lower end (182) of the spring (175) is either coplanar to, or above, the bottom (13) of the base (11). The elevating plate (174) also has at least one plunger (176) with a shaft (183) and a knob (184). The shaft (183) has a first end (185) and a second end (186). The first end (185) of the shaft (183) is attached to the lower surface (180) of the elevating plate (174). The knob (184) is located at the second end (186) of the shaft (183). The knob (184) engages the at least one releasable locking means (177) when the movable collar (187) receives the knob (184) of the at least one plunger (176). An activator (178) moves the movable collar (187) from a first position to a second position. The first position holds the knob (184) in a lower stationary position, while the second position permits the knob (184), thus the at least one plunger (176), to rise to a position above the first position. The force of the spring (175) pushes the elevating plate (174) upwards, thus raising the position of the bowl element (20) above the lip (17) at the top (14) of the base (11) so that an operator may remove the bowl element (20) without the necessity of touching the interior surface (23).

Figure 9:
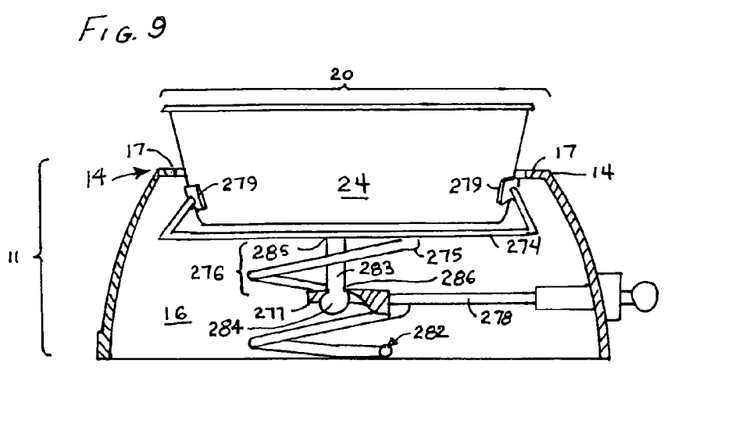
FIG. 9 is a cutaway side view of one embodiment of the invention where the elevating means is a spring mechanism with a side-engaging element.

In certain other embodiments, as illustrated in FIG. 9, the elevating means comprises an elevating plate (274), a spring (275), at least one plunger (276), at least one releasable locking means (277), and an activator (278). The elevating plate (274) has at least one side-wall-engaging upper surface (279) for engaging the at least one side wall (24) of the bowl element (20). The elevating plate (274) has a lower surface (280). The spring (275) has an upper end (281), attached to the lower surface (280) of the elevating plate (274). The spring (275) also has a lower end (282), at a fixed position within the interior space (16) of the base (11). The position of the lower end (282) of the spring (275), is either coplanar to, or above, the bottom (13) of the base (11). The elevating plate (274) also has at least one plunger (276) with a shaft (283) and a knob (284). The shaft (283) has a first end (285) and a second end (286). The first end (285) of the shaft (283) is attached to the lower surface (280) of the elevating plate (274). The knob (284) is located at the second end (286) of the shaft (283). The knob (284) engages the at least one releasable locking means (277) when the movable collar (287) receives the knob (284) of the at least one plunger (276). An activator (278) moves the movable collar (287) from a first position to a second position. The first position holds the knob (284) in a lower stationary position, while the second position permits the knob (284), and thus the at least one plunger (276), to rise to a position above the first position. The force of the spring (275) pushes the elevating plate (274) upwards, thus raising the position of the bowl element (20) above the lip (17) at the top (14) of the base (11) so that an operator may remove the bowl element (20) without the necessity of touching the interior surface (23).

Figure 12:
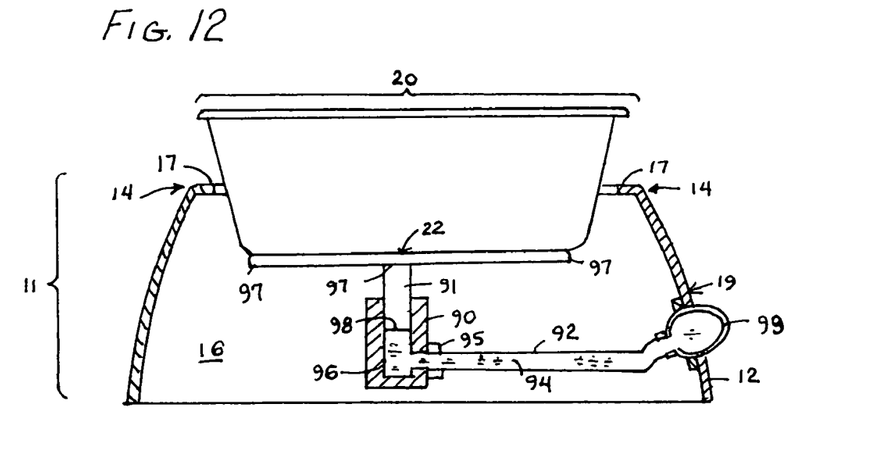
FIG. 12 is a cutaway side view of one embodiment of the invention where the elevating means employs a load cylinder with an underside-engaging element.

In certain other embodiments, as illustrated in FIG. 12, the elevating means (30) comprises a load cylinder (90), a load piston (91), a fluid or gas line (92), and a source (93) of fluid or gas (94). The load cylinder (90) has an interior (96), and an inlet (95). The load piston (91) is located in the interior (96) of the load cylinder (90). The load piston (91) has an underside-engaging upper surface (97) and a lower surface (98). The underside-engaging upper surface (97) engages the underside (22) of the bowl element (20). The fluid or gas (94) is in fluid communication with the fluid or gas line (92) and the interior (96) of the load cylinder (90) for moving the load piston (91). In certain embodiments, one source of fluid or gas (93) would be a reservoir (99) positioned near the exterior (19) of the at least one side (12) of the base (11). As illustrated in FIG. 12, the reservoir (99) could be a bulb or a pump. In the operation to raise the bowl element (20) out of the base (11), the fluid or gas (94) fills the load cylinder (96) thus moving the load piston (91). The underside (22) of the bowl element (20) is engaged by the underside-engaging upper surface (97) of the load piston (91). As the load piston (91) rises from a first load piston position to a second position above the first load piston position, the bowl element (20) is raised. Having raised the position of the bowl element (20) above the lip (17) at the top (14) of the base (11), an operator may remove the bowl element (20) without the necessity of touching the interior surface (23).

Figure 13:
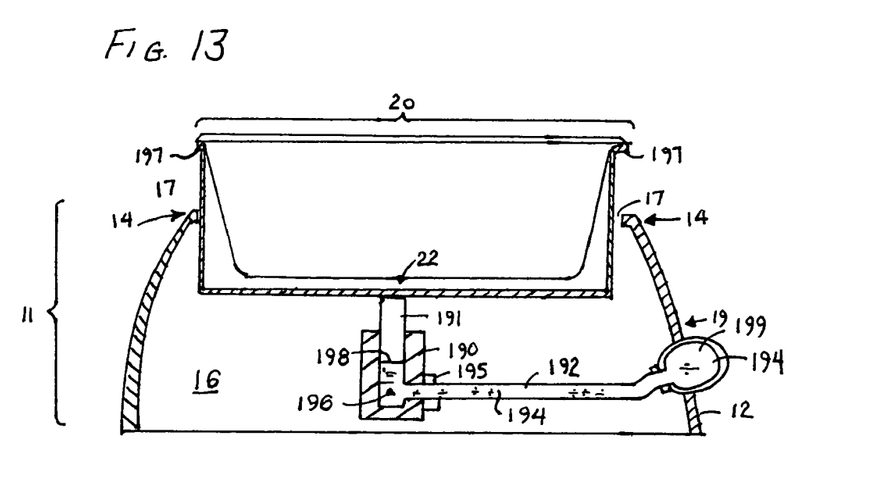
FIG. 13 is a cutaway side view of one embodiment of the invention where the elevating means employs a load cylinder with a rim-engaging element.

In certain other embodiments, as illustrated in FIG. 13, the elevating means (30) comprises a load cylinder (190), a load piston (191), a fluid or gas line (192), and a source (193) of fluid or gas (194). The load cylinder (190) has an interior (196), and an inlet (195). The load piston (191) is located in the interior (196) of the load cylinder (190). The load piston (191) has at least one rim-engaging upper surface (197) and a lower surface (198). The at least one rim-engaging upper surface (197) engages the lower face (26) of rim (21) of the bowl element (20). The fluid or gas (194) is in fluid communication with the fluid or gas line (192) and the interior (196) of the load cylinder (190) for moving the load piston (191). In certain embodiments, one source of fluid or gas (193) would be a reservoir (199) positioned near the exterior (19) of the at least one side (12) of the base (11). As illustrated in FIG. 13, the reservoir (199) could be a bulb or a pump. In the operation to raise the bowl element (20) out of the base (11), the fluid or gas (194) fills the load cylinder (196) thus moving the load piston (191). The lower face (26) of rim (21) of the bowl element (20) is engaged by the at least one rim-engaging upper surface (197) of the load piston (191). As the load piston (191) rises from a first load piston position to a second position above the first load piston position, the bowl element (20) is raised. Having raised the position of the bowl element (20) above the lip (17) at the top (14) of the base (11), an operator may remove the bowl element (20) without the necessity of touching the interior surface (23).

Figure 14:
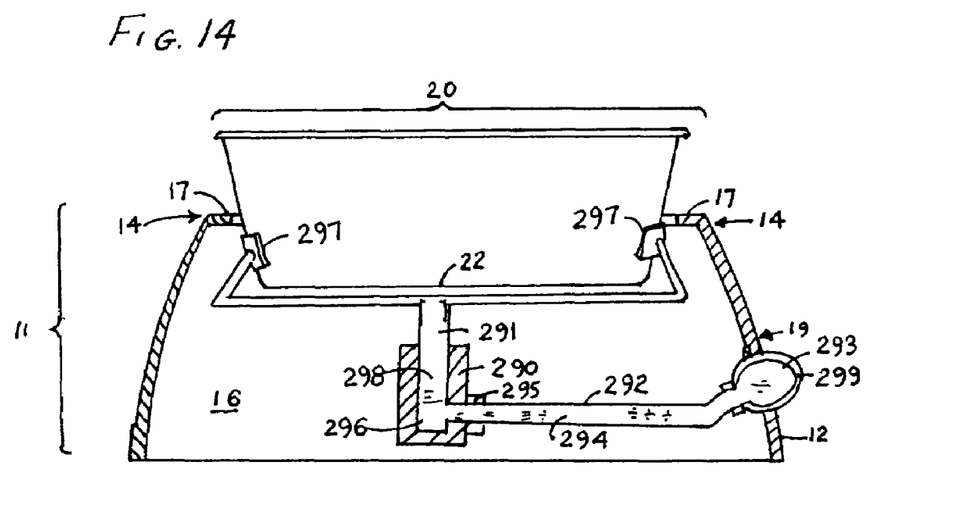
FIG. 14 is a cutaway side view of one embodiment of the invention where the elevating means employs a load cylinder with a side-engaging element.

In certain other embodiments, as illustrated in FIG. 14, the elevating means (30) comprises a load cylinder (290), a load piston (291), a fluid or gas line (292), and a source (293) of fluid or gas (294). The load cylinder (290) has an interior (296), and an inlet (295). The load piston (291) is located in the interior (296) of the load cylinder (292). The load piston (291) has at least one side-wall-engaging upper surface (297) and a lower surface (298). The at least one side-wall-engaging upper surface (297) engages the exterior (19) of the at least one side (12) of the bowl element (20). The fluid or gas (294) is in fluid communication with the fluid or gas line (292) and the interior (296) of the load cylinder (290) for moving the load piston (291). In certain embodiments, one source of fluid or gas (293) would be a reservoir (299) positioned near the exterior (19) of the at least one side (12) of the base (11). As illustrated in FIG. 14, the reservoir (299) could be a bulb or a pump. In the operation to raise the bowl element (20) out of the base (11), the fluid or gas (294) fills the load cylinder (296) thus moving the load piston (291). The exterior (19) of the at least one side (12) of the bowl element (20) is engaged by the at least one side-wall-engaging upper surface (297) of the load piston (291). As the load piston (291) rises from a first load piston position to a second position above the first load piston position, the bowl element (20) is raised. Having raised the position of the bowl element (20) above the lip (17) at the top (14) of the base (11), an operator may remove the bowl element (20) without the necessity of touching the interior surface (23).

The method of this invention uses an apparatus (10) with at least one removable and replaceable receptacle bowl element (20) or liner (53) in a base (11). The method requires the placing and raising of at least one removable and replaceable receptacle bowl element or liner (20). The method comprises: placing a bowl element (20) in a base (11); inserting the underside (22) of the bowl element (20) through the aperture (15) at the top (14) of the base (11) such that the underside (22) of the bowl element (20) is located within the inside of the base (11). The method further comprises supporting, at least in part, the rim (21) of the bowl element (20) by the periphery (27) of the top (14) of the base (11), and contacting the rim (21), underside (22), or at least one side wall (24) of the bowl element (20), with an elevating means (30) thus raising, with the elevating means (30), the bowl element (20) from the base (11).

This invention is an improvement of the prior art. In particular, prior art animal feeding bowls do not employ components which permit an operator to remove a bowl with mechanical assistance. The relevant prior art assumes that an operator will initiate removal of a bowl mounted in a base with fingers, by lifting the edge of, or the interior of, the liner or bowl or by grabbing a tab.

The apparatus of this invention is novel. The apparatus of this invention employs a variety of elevating means to disengage the liner (53) or bowl element (20) from the base (11). In some preferred embodiments, the elevating means engage the underside of the bowl element (20) and raise the bowl element (20) so that an operator can grasp the rim or the exterior of the at least one side wall (24) without the necessity of touching the interior surface (23) of the bowl element (20).

In other preferred embodiments, the elevating means engage at least one side of the liner (53) or bowl element (20). In these embodiments, the elevating means (30) engage the side of the bowl and either lifts or deforms the bowl element (20). In the process of deforming the side of the bowl, the rim is deformed, thus permitting an operator to grasp the bowl element without the necessity of touching the interior surface (23) of the bowl element (20).

In other preferred embodiments, the elevating means engage the underside of the rim of the bowl element. In these embodiments, the elevating means engage the lower face (26) of the rim (21) of the bowl element (21). When the bowl element (20) is lifted, a space is opened between the top of the base and the lower edge of the rim, thus permitting access by an operator to the at least one side wall (24) of the bowl element (20). By these alternate means, an operator can grasp the rim or the exterior surface of the at least one side wall (24) of the bowl element (20) without the necessity of touching the interior surface (23) of the bowl element (20).

The method of this invention is distinguished from the prior art. Rather than having the bowl removed by an operator grasping the rim or the interior of a used or soiled bowl, the method of this invention permits the sanitary removal of a bowl from the base by an elevating means.

It is contemplated that the components of the invention are to be made of metal, plastic, paper, ceramic, glass, and foil. This invention has a novel mechanical construction permitting the safe, accurate, and easy placement of a bowl in a base. The use of metal, plastic, paper, ceramic, glass and foil is not intended as limiting the scope of the invention, but is contemplated and described here in order to better illustrate the components of the invention. Additionally, the size of the components employed is not intended as a limit of the invention disclosed or the various embodiments of this invention. It is contemplated that in other embodiments of his invention components may be made of metal, plastic, wood or other suitable materials for performing the function of the elements of the invention.

This invention addresses the need to have a feeding apparatus for pets which is cleaner in operation, both during the feeding and afterwards, in the process of removing the bowl from the base. While the apparatus of this invention is directed primarily for use with pet food, dispensing and serving, the apparatus of this invention is applicable where a sanitary bowl is desired: one application of this apparatus is for the dispensing of food to humans; whether used in dispensing snack foods to adults or nutritional food to children or having a sanitary means for having food dispensed in a hospital environment, the apparatus of this invention is diversely applicable. Another application pertains to the manicure service industry: warm fluid can be in the bowl element (20), or liner (53) for placement in a bowl element (20), for placement in the base (11) for sanitary purposes. One advantage comprises an operator being able to sanitarily remove a replaceable and sanitary bowl from a base with a non-skid type feature.

I claim:

1. An apparatus comprising:
    a base comprising at least one side that defines an interior space, the at least one side forming a periphery that defines an aperture above the interior space;
    a bowl element having a rim, the bowl element being shaped to fit into the interior space of the base such that the rim abuts the periphery; and
    a lever mechanism comprising:
        a lever having a proximal end directly abutting the bowl element when the bowl element is in the interior space of the base, and a distal end opposite the proximal end and extending outside the at least one side of the base;
        a fulcrum having an aperture for receiving the lever therethrough, the fulcrum further having a pair of ears on opposite sides of the aperture;
        at least one pin extends through each of the pair of ears into the lever between the proximal and distal ends for pivotally mounting the lever on the fulcrum; and
        attachment element secured directly to the at least one side of the base; the fulcrum extends directly from the attachment element;
    whereby depressing the distal end of the lever raises the proximal end and ejects the bowl element from the interior space of the base.

2. The apparatus of claim 1, further comprising at least one securing pad attached to a bottom of the base.

3. The apparatus of claim 1, further comprising a cavity through the at least one side of the base, the cavity being shaped and positioned to facilitate picking up the base.

\* \* \* \* \*